United States Patent Office 3,238,126
Patented Mar. 1, 1966

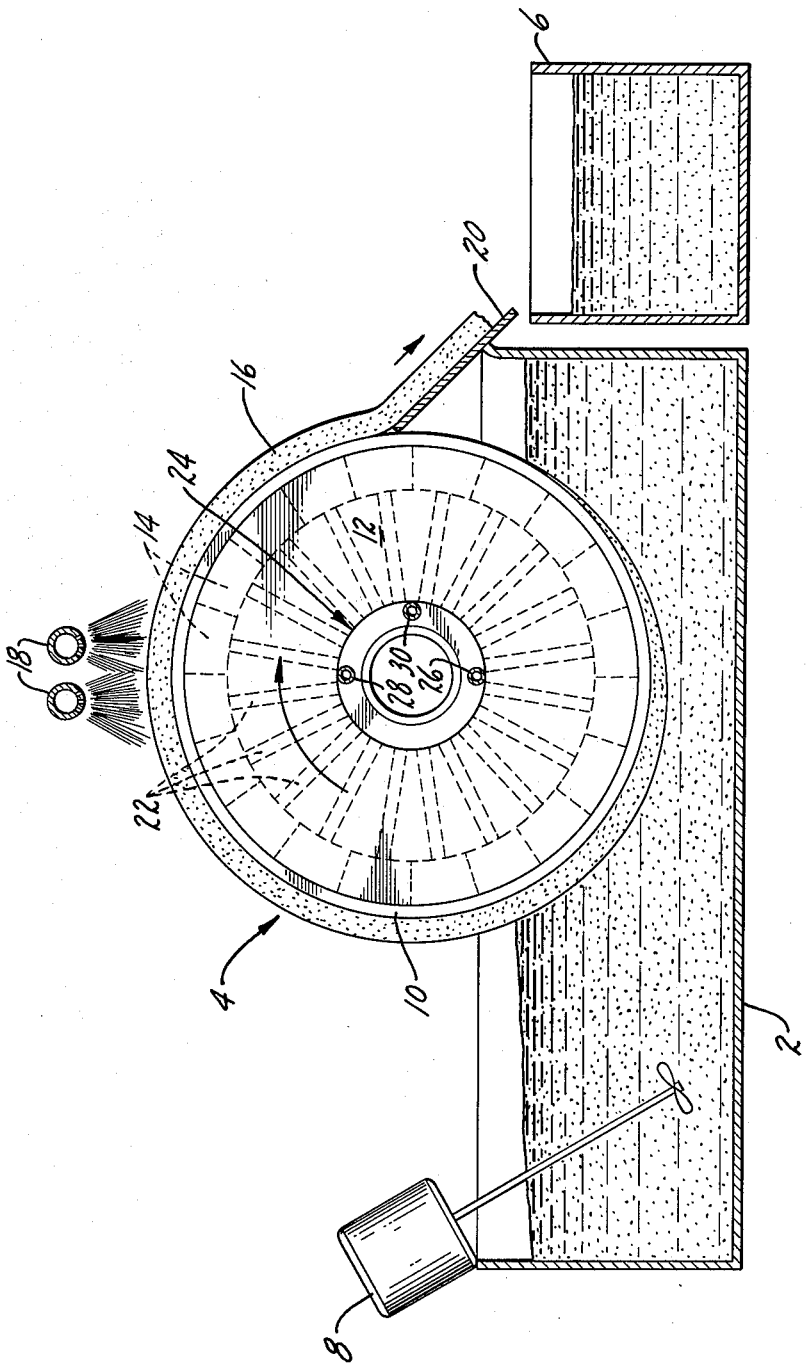

3,238,126
METHOD OF REGENERATING PARTICULATE ION EXCHANGE RESIN PARTICLES
Joseph A. Levendusky, Bayonne, N.J., and Joseph R. Capecci, Bronx, N.Y., assignors to Union Tank Car Company, Chicago, Ill., a corporation of New Jersey
Filed Mar. 8, 1963, Ser. No. 263,812
2 Claims. (Cl. 210—34)

This invention relates to the regeneration of ion exchange resin particles in the size range of about 60 to 400 mesh and, more particularly, to the regeneration of ion exchange resin particles having non-uniform sizes in the range of about 60 to 400 mesh.

It is well known that ion exchange resins are used in fluid purification where it is desired to remove ionized dissolved materials from the fluid. In the demineralization of water, for example, a dissolved metallic salt may be removed by passing the water first through a bed of cation exchange resin particles and then through a bed of anion exchange resin particles. In the cation bed the metallic ions are taken up by the cation resin particles in exchange for hydrogen ions from these resin particles and the acid corresponding to the metallic salt is formed in the water. When the water is passed through the bed of anion exchange resin particles the acid is converted to water, as the salt ion is taken up by the anion resin particles in exchange for a hydroxide ion from the resin particles.

However, after prolonged use, the ion exchange resin particles lose their ability to perform this ion exchange reaction, since most or all of their exchangeable ions have been expended. In such a state the resin particles are "exhausted." The ion exchange properties of these resin particles are restored by regeneration. Cation exchange resin particles may be regenerated, for example, by contacting these resin particles with an aqueous acid solution. On the other hand, anion exchange resin particles may be regenerated, for example, by contacting them with an aqueous sodium hydroxide solution. Furthermore, the resin particles are often regenerated prior to being used for the first time.

Suitable regenerant solutions for ion exchange resin particles are well known in the art. The particular regenerant solution employed is, of course, dependent upon the type of ion exchange resin particle and its use.

Standard ion exchange resin particles are in the size range of 20–50 mesh and will hereinafter be referred to as "large bead" resin particles. The regeneration of these large bead resin particles is often conducted in the demineralizer or ion exchange tank itself, but may also be carried out in another tank to which the large bead resin particles have been transferred. In either case, the exhausted large bead resin particles are regenerated by passing a suitable regenerant solution through a bed of the exhausted resin particles in substantially the same manner that the water or other fluid was passed through the bed of resin particles during demineralization.

For example, when large bead ion exchange resin particles are employed to demineralize water, a two tank system is commonly employed. That is, one tank will contain a bed of cation exchange resin particles and the other tank will contain a bed of anion exchange resin particles. Each bed will have a depth of about 30 to 40 inches. The bed of large bead cation exchange resin particles is regenerated by passing an aqueous acid solution through the bed and the bed of large bead anion resin particles is regenerated by passing an aqueous sodium hydroxide solution through the bed. Of course, if desired, each bed of large bead resin particles may be transferred to another tank and regenerated therein in the same manner.

Other methods have also been employed to regenerate large bead ion exchange resin particles. One method is to mix the exhausted large bead resin particles with the regenerant solution, and after sufficient contacting time has elapsed, separate the resin particles from the regenerant solution by centrifugal means. Counter-current contacting of the large bead resin particles with a regenerant solution has also been employed successfully. When it is desirable that the demineralization or purification process be substantially continuous, these latter regeneration processes are particularly advantageous since the regeneration is effected outside the demineralizer tanks which may, in the meantime, be re-filled with fresh resin particles and, in this manner, the demineralization process continued.

It has recently been found that improved purification of fluids may be obtained by the use of ion exchange resin particles in the size range of about 60 to 400 mesh, hereinafter sometimes referred to as "finely divided" ion exchange resin particles. This improved purification system is described in detail in Joseph A. Levendusky's applications, Serial No. 133,670, filed August 24, 1961, now abandoned, and Serial No. 263,999, filed March 8, 1963, filed concurrently herewith, both of which are assigned to the same assignee as this application. Like the large bead ion exchange resin particles, these finely divided ion exchange resin particles become exhausted after prolonged use. However, the regeneration of these finely divided ion exchange resins presents different problems from the regeneration of the large bead ion exchange resins. As a result, the previously discussed methods of regenerating the large bead ion exchange resins, among others, have proved to be impractical when applied to the finely divided resin particles.

For example, the usual practice of passing the regenerant solution through a deep bed of the resin particles, i.e., a bed of 30 to 40 inches, is not feasible with the finely divided resin particles. Due to the small interstices between the finely divided ion exchange resin particles and the inherent compaction of these resin particles in a deep bed, there is a very large pressure drop across a deep bed of the finely divided resin particles. This large pressure drop means low flow rates or, if high flow rates are to be maintained, that the regenerant solution must be passed through the bed under a higher pressure. Low regenerant flow rates increase the time required to regenerate the resin particles, while high flow rates increase the danger of channeling or upsetting the bed, among other things. Of course, the pressure drop may be decreased by decreasing the depth of the bed, but in the usual batch type of regeneration operation a shallow bed would require tanks with extremely large cross-sectional areas. Such tanks would be so costly that it is cheaper to discard the exhausted finely divided resin particles.

Mixing the finely divided resin particles with the regenerant solution and separating them with centrifugal separating means is likewise unsatisfactory. During centrifugal separation the finely divided particles build up and form a layer on the filter screen wall of the centrifugal separator, while the regenerant solution passes through the layer of particles and the filter screen and is collected by suitable means. However, the finely divided resin particles are generally of non-uniform size. The larger of these finely divided particles, by virtue of their greater mass, will be the first to deposit on the filter screen, the medium size finely divided resin particles next and so on. Thus, rather than forming a homogeneous layer of the finely divided resin particles on the filter screen, the particles will be stratified according to their size. Since particles of the same size pack more closely than particles of different sizes, the finely divided particles in each stratum will be very closely packed. Therefore, a large pressure drop across the layer of deposited finely divided resin particles is created. This large pressure drop, which is further increased by virtue of the small size of these finely divided resin particles, severely limits the amount of regenerant solution and resin particles which may be separated by a centrifugal separator. Accordingly, this method of regeneration has been found to be unsuitable for regenerating a large amount of finely divided resin particles.

When the finely divided ion exchange resin particles are counter-currently contacted with the regenerant solution, a significant portion of the finely divided resin particles, because they are so small, is carried away with the regenerant solution. As a result further separation steps were required to recover these finely divided resin particles from the regenerant solution. Therefore, counter-current contacting of the regenerant solution and finely divided resin particles is an unsatisfactory method of regenerating these finely divided resin particles.

Accordingly, it has heretofore been the practice to discard exhausted finely divided ion exchange resin particles rather than regenerate them as a suitable method for regenerating these particles was not known.

It is therefore an object of the present invention to provide a method for regenerating ion exchange resin particles having non-uniform sizes in the range of about 60 to 400 mesh.

It is a further object of the present invention to provide a method for regenerating ion exchange resin particles having non-uniform sizes in the range of about 60 to 400 mesh, said method being adapted to continuously regenerate any desired quantity of such finely divided resin particles.

It is still another object of the present invention to provide a practical, economical and efficient method for regenerating ion exchange resin particles having non-uniform sizes in the range of about 60 to 400 mesh.

These and other objects more apparent hereinafter are accomplished by the method of the present invention which comprises, generally, dispersing ion exchange resin particles having non-uniform sizes in the range of about 60 to 400 mesh in a regenerant solution and separating the resin particles from the regenerant solution by a filter screen having a low pressure zone on one side thereof whereby the resin particles form a recoverable layer on the filter screen while the regenerant solution passes through the layer and the filter screen into the low pressure zone.

In accordance with the method of the present invention, the layer of resin particles formed on the filter screen has a minimum pressure drop. Accordingly, the present method is adapted to handle large quantities of finely divided resin particles per unit time. The layer of finely divided resin particles will not tend to channel. In addition, as will be more apparent hereinafter, the method of the present invention is adapted to continuously regenerate any amount of finely divided resin particles.

The term "filter screen," as used herein, is intended to embrace a filter cloth, filter leaf and other filter media, which may be made of wire, cloth, synthetic or natural fiber wound elements, such as cotton-wound or nylon-wound elements, paper and the like as is well known in the art.

The invention, both as to its organization and method of operation, taken with further objects and advantages thereof, will be understood by reference to the following description taken in conjunction with the accompanying drawing, in which the figure schematically illustrates a regeneration system employing the method of the present invention for regenerating ion exchange resin particles having non-uniform sizes in the range of about 60 to 400 mesh.

Referring to the drawing, a regeneration system for regenerating ion exchange resin particles having non-uniform sizes in the range of 60 to 400 mesh in accordance with the method of the present invention comprises a regeneration tank 2, a rotary vacuum separator, indicated generally by reference numeral 4, and a collecting tank 6. The ion exchange resin particles having non-uniform sizes in the range of 60 to 400 mesh are intimately contacted with and dispersed in a regenerant solution in the regeneration tank 2. The rotary vacuum separator 4 separates the resin particles from the regenerant solution and the collecting tank 6 receives the regenerated resin particles recovered from the rotary vacuum separator 4.

In accordance with the method of the present invention the regeneration tank 2 is filled with a regenerant solution. Exhausted ion exchange resin particles having non-uniform sizes in the range of 60 to 400 mesh are added to the regenerant solution in the regeneration tank 2. An agitator 8, such as a propellor driven by an electric motor, extends into the regenerant solution in the regeneration tank 2 and is turned on so that the finely divided resin particles are intimately contacted with and dispersed in the regenerant solution. As will be more apparent hereinafter, it is important that these finely divided resins be homogeneously dispersed in the regenerant solution; that is, the finely divided resin particles are not allowed to stratify in the regenerant solution by settling.

Suitable regenerant solutions, such as an aqueous sodium hydroxide solution or an aqueous acid solution, are well known in the art. The particular regenerant solution employed will be dependent upon the type and kind of finely divided ion exchange resin particles being regenerated and, in addition, upon the manner in which the finely divided resin particles have become exhausted. The quantity of regenerant solution employed will likewise vary depending upon the circumstances and is within the ordinary skill of one in the art.

The rotary vacuum separator 4 is a "Drum Type Rotary Vacuum Filter" manufactured by Filtration Engineers Division of American Machine and Metals, Inc., and described in detail in their Bulletin 103 and Manual 9625–2A. The rotary vacuum separator 4 partially extends into the regenerant solution in the regeneration tank 2 and comprises two concentrically disposed drums—an outer, screened drum 10 and a compartmented inner drum 12—which rotate together. The outer drum 10 is covered with a filter screen, which may be made of cloth, wire mesh or other suitable material, which has apertures large enough to permit liquid to flow therethrough, but small enough to prevent the passage of substantially all of the finely divided ion exchange resin particles therethrough.

The inner drum 12 contains a plurality of radially extending compartments 14 disposed about its inner periphery. The filter screen on the outer drum 10 forms the outer periphery of the compartments 14. Each of the compartments 14, which open only at the periphery of the inner drum 12, are connected to a drain line 22. The drain lines 22 are connected to a common automatic valve indicated generally by reference numeral 24. The automatic valve 24 has a filtering outlet 26, a washing outlet 28 and an air inlet 30. The filtering outlet is connected to a vacuum system (not shown) so that the compartments 14 are maintained at a low pressure or partial vacuum as the finely divided particles are being separated from the regenerant solution. The washing outlet is connected to a vacuum system (not shown) so that the compartments 14 are maintained at a low pressure or partial vacuum as the finely divided particles are being washed. The air inlet 30 is connected to an air pressure system to assist in removing the filter cake of finely divided resin particles from the vacuum separator 4. In this manner, as the drums 10 and 12 rotate, each compartment 14 goes through the same cycle of operation—filtering, washing, and discharging the cake—controlled in repeating sequence by the automatic valve 24.

After the finely divided resin particles have been thoroughly dispersed in the regenerant solution for a sufficient period of time to regenerate the resin particles, the rotary vacuum separator 4 is turned on causing the drums 10 and 12 to rotate in a clockwise direction when viewing the figure. By virtue of the automatic valve 24, the compartments 14 entering the regenerant solution are connected to the filtering outlet 26 and a low pressure is maintained in these compartments 14. Accordingly, the regenerate solution adjacent the separator 4 and the finely divided resin particles dispersed therein are drawn toward the compartments 14. The regenerant solution will pass through the filter screen of the outer drum 10 into the compartments 14, while the finely divided ion exchange resin particles will form a continuous layer 16 on the filter screen of the outer drum 10. The recovered regenerant solution will be withdrawn from the compartments 14 through the drain lines 22 and pass through the valve 24 and the filtering outlet 26 to a suitable collecting means (not shown).

By virtue of the finely divided resin particles being homogeneously dispersed in the regenerant solution as the rotary vacuum separator 4 operates, the layer 16 will have a maximum thickness for the predetermined pressure in the compartments 14. The homogeneous dispersion of the finely divided ion exchange resins in the regenerant solution prevents stratification of these non-uniform-size finely divided ion exchange resins in the layer 16 and thereby reduces the pressure drop across a given thickness of the layer 16. Accordingly, a larger layer 16 may be built up on the filter screen of the outer drum 10 for a given pressure drop. In addition, an even layer of resin particles is provided wherein channeling of the regenerant solution through the layer 16 is precluded. The pressure in the compartments 14 will be maintained at a predetermined value in the range of about 0 to 13 p.s.i.a. during filtering. The layer 16 will have a thickness in the range of about ¼ to 3 inches, preferably ½ to 1 inch.

As the vacuum separator 4 continues to rotate, the layer 16 of finely divided ion exchange resin particles is carried from the regeneration tank 2. Preferably, the layer 16 is rinsed with a wash solution, such as a demineralized water, or additional regenerant solution. To these ends, a manifold 18 is provided above the rotary vacuum separator 4 and is adapted to spray a wash solution or regenerant solution on the layer 16 of finely divided ion exchange resin particles. The rinse water or regenerant solution from the manifold 18 passes through the layer 16 of finely divided resin particles and into the compartments 14 which have now been connected to the washing outlet 28 by the automatic valve 24. The compartments 14 are maintained at a low pressure or partial vacuum in the range of 0 to 13 p.s.i.a. during the washing stage and the wash solution or regenerant solution sprayed on the layer 16 passes from the compartments 14 through the drain lines 22 to the valve 24, the washing outlet 28, and a suitable collecting means (not shown).

For most effective utilization of the washing step it has been found that the layer 16 should have a moisture content in the range of 50 to 80 percent by weight so that the layer 16 does not crack prior to being washed. Cracking of the cake will cause channeling of the wash solution and reduce the efficiency of the washing step.

The layer 16 of finely divided ion exchange resin particles is scraped from the filter screen of the outer drum 10 by means of a blade 20 or other suitable means and the resin particles fall into the collecting tank 6. Just prior to the layer 16 of resin particles being scraped from the filter screen, the compartment 14 is connected by the valve 24 to the air inlet 30. In this manner air under pressure will pass into the compartment 14 to assist in freeing the layer 16 from the filter screen. Accordingly, the blade 20 will remove substantially all of the resin particles from the filter screen.

If further regeneration of these resin particles is required, the cycle is repeated to complete the regeneration of the finely divided resin particles. The cycle may be repeated by adding regenerant solution to the collecting tank 4 and recirculating the mixture of regenerant solution and resin particles to the regenerating tank 2.

Of course, if the regenerated finely divided resin particles are to be utilized as a pre-coat in the purification process described in detail in Joseph A. Levendusky's applications, Serial No. 133,670 and Serial No. 263,999, referred to hereinbefore, the collecting tank may be filled with demineralized water whereby the desired pre-coat slurry is prepared in the collecting tank 6, as shown in the figure.

The rotary vacuum separator 4 is merely illustrative of suitable vacuum separators which may be employed in the present invention, as any other endless filter screen-type vacuum separator may also be employed. Though the regeneration method of the present invention has been described as a batch process, the finely divided ion exchange resin particles and regenerant solution may be continuously added to the regeneration tank 2. Furthermore, regeneration may be effected in another tank and the mixture of regenerant solution and resin particles transferred to the tank 2. Accordingly, the regeneration process of the present invention is adapted to regenerate any amount of finely divided resin particles having non-uniform sizes in the range of 60–400 mesh. The present process is preferably employed on resin particles having non-uniform sizes in the range of 100–400 mesh, and most preferably in the range of 200–400 mesh.

Some of the advantages of the present invention will be apparent from the following example:

*Example*

The regeneration system comprised a regeneration tank with an agitator, a filtering tank having a rotary vacuum separator and an agitator, and a collecting tank. The rotary vacuum separator was of the type discussed in detail hereinbefore having an outer drum 12 inches in length and a 12-inch diameter. The filter screen had an effective porosity of 5 microns. The regeneration tank had an outlet line with a pump for transferring a mixture of regenerant solution and resin particles to the filtering tank. There was an overflow line from the filtering tank to the regeneration tank. A line, with a pump, connected the collecting tank to the regeneration tank for recycle.

One hundred pounds of exhausted cation exchange resin particles in the sodium form and having non-uniform sizes in the range of about 60 to 400 mesh was regenerated to the hydrogen form.

A regenerant solution comprising an aqueous solution containing 4% by weight sulfuric acid was placed in a regeneration tank. The exhausted cation exchange resin particles were placed in the tank and the agitator turned on to homogeneously disperse the resin particles in the regenerant solution. The entire volume of the system was brought up to about 70 gallons by the addition of regenerant solution. In this manner the mixture of regenerant solution and resin particles recycled from the regeneration tank to the filter tank and back to the regeneration tank. The regeneration tank contained about 50 gallons and the filter tank about 20 gallons. This was continued for an hour and then the rotary vacuum separator was turned on. The drum rotated at about 25–30 r.p.h.

The pressure in the compartments of the separator during filtering and washing was maintained at 4.7 p.s.i.a. to obtain the optimum layer thickness on the drum and to avoid cracking of the layer as the drum rotated. The vacuum separator picked up the resin particles from the regenerant solution. These resin particles adhered to the filter screen of the outer drum and formed a layer of ion exchange resin particles about 2½ inches thick. This layer was rinsed with demineralized water and scraped from the drum, the resin particles dropping into a collecting tank containing fresh regenerant solution. To assure proper washing and prevent cracking of the layer the moisture content of the layer of resin particles was maintained in the range of 50–70 percent by weight during each cycle.

The mixture of fresh regenerant solution and resin particles was recycled to the regenerating tank. The cycle was repeated until 20 lbs. of regenerant solution per ft.$^3$ of resin particles had been administered. The regenerated resin particles had a final moisture content of about 65% and were found to be converted from the sodium form to the hydrogen form as desired.

While the embodiment described herein is at present considered to be preferred, it will be understood that various modifications and improvements may be made therein and it is intended to cover in the appended claims all such modifications and improvements as fall within the true spirit and scope of the invention.

What is claimed is:

1. The method of regenerating ion exchange resin particles having non-uniform sizes in the range of about 60 to 400 mesh comprising the steps of mixing said ion exchange resin particles with a regenerant solution to form a mixture, agitating said mixture to substantially homogenously disperse said ion exchange materials in said regenerant solution, separating said resin particles from said regenerant solution by passing a filter screen into said mixture, applying a partial vacuum to one side of said filter screen thereby causing a portion of said mixture to be drawn toward said source of partial vacuum, said filter screen preventing the passage of said resin particles to said source of lower pressure whereby said resin particles are deposited on the other side of said filter screen while permitting the passage of said regenerant solution through said filter screen, said resin particles forming a layer on said filter screen, removing said layer from said mixture on said filter screen, rinsing said resin particles in said layer with a demineralized liquid, removing said demineralized liquid from said resin particles by applying a partial vacuum to said rinsed resin particles in said layer on said filter screen, removing said layer from said filter screen and again passing said filter screen through said mixture.

2. The method of regenerating ion exchange resin particles having non-uniform sizes in the range of about 60 to 400 mesh comprising the steps of forming a mixture of said resin particles with a regenerant solution, agitating said mixture whereby said resin particles are substantially homogeneously dispersed in said regenerant solution, simultaneously separating said resin particles from said regenerant solution by passing a filter screen into said mixture, said filter screen having a low pressure zone on one side thereof whereby a portion of said mixture is drawn toward said low pressure zone, removing said portion from said mixture, said resin particles in said portion depositing on said filter screen to form a layer of said resin particles on said filter screen, said regenerant solution of said portion passing through said filter screen into said low pressure zone, rinsing said layer by contacting said resin particles in said layer with demineralized water, removing said water from said layer by applying a low pressure on said rinsed resin particles, and removing said rinsed resin particles from said filter screen.

References Cited by the Examiner

UNITED STATES PATENTS

| 2,100,149 | 11/1937 | Qviller | 210—75 |
| 2,352,304 | 6/1944 | Young | 210—77 |
| 2,737,508 | 3/1956 | Axe | 210—33 |
| 2,812,065 | 11/1957 | Wilson | 210—500 |

FOREIGN PATENTS 627,007   9/1961   Canada.

MORRIS O. WOLK, *Primary Examiner.*